Figure 12:
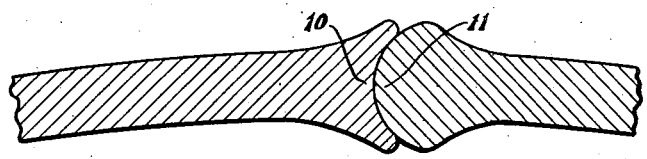

June 24, 1930.   C. A. FRAHM ET AL   1,765,368
METHOD OF WELDING
Filed Feb. 13, 1928   4 Sheets-Sheet 1
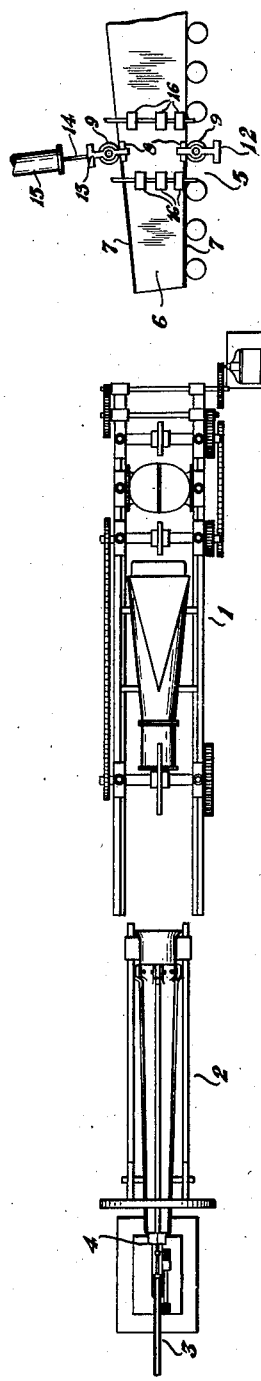
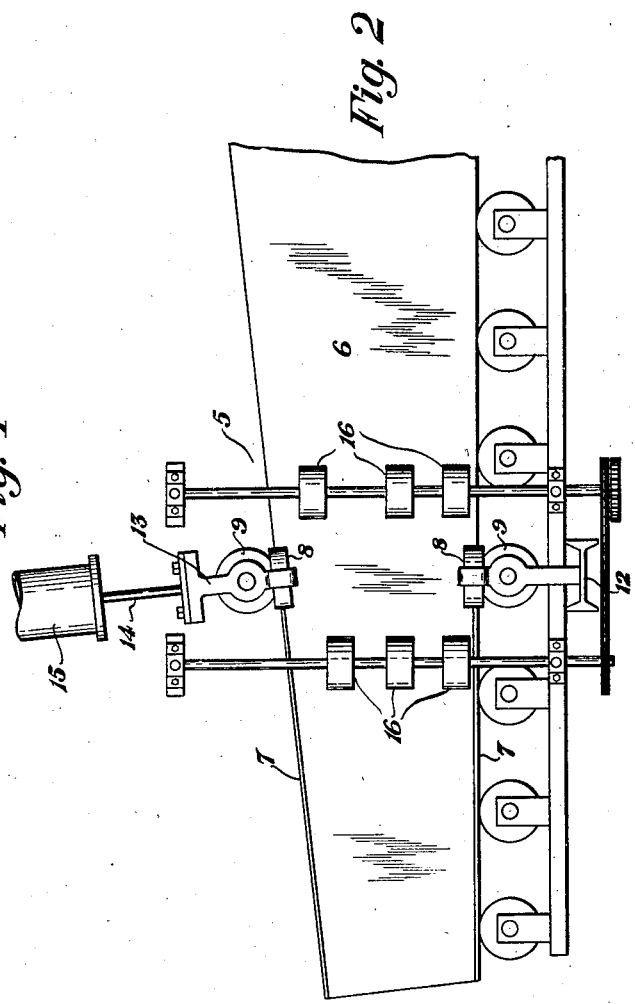
Inventor
C. A. Frahm
E. W. Riemenschneider
By Freast and Bond
Attorneys

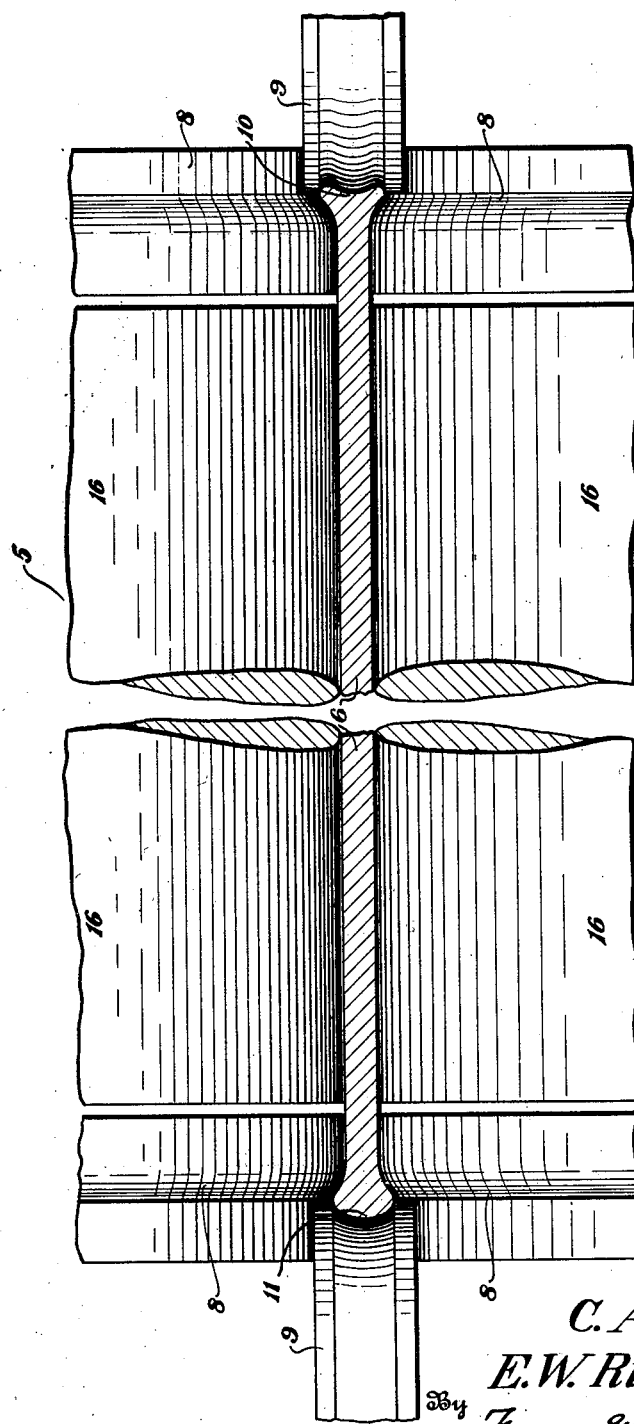

June 24, 1930. C. A. FRAHM ET AL 1,765,368
METHOD OF WELDING
Filed Feb. 13, 1928 4 Sheets-Sheet 3
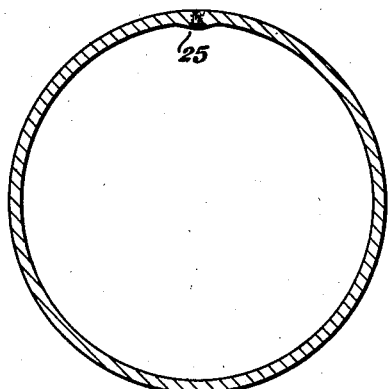
Fig. 5
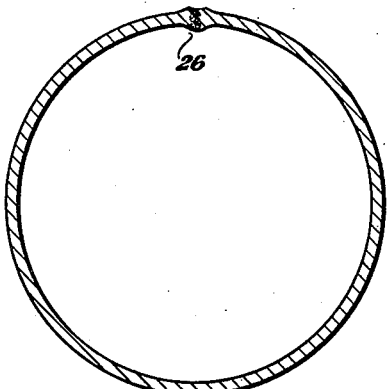
Fig. 6
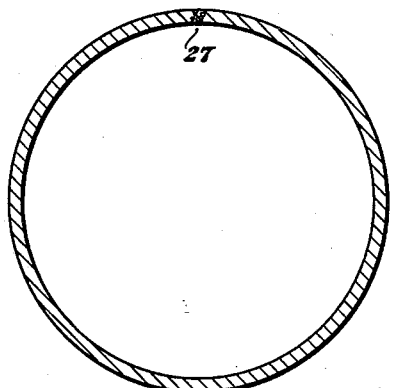
Fig. 7
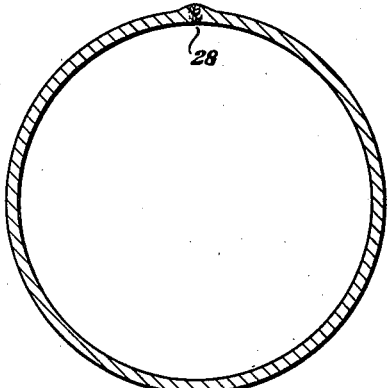
Fig. 8
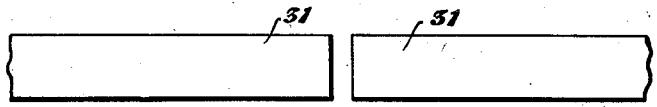
Fig. 9
Fig. 10
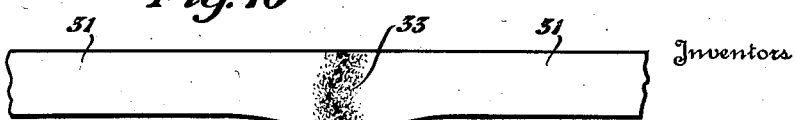
Fig. 11
Fig. 4
Inventors
C. A. Frahm
E. W. Riemenschneider
By Freast and Bond Attorneys June 24, 1930.          C. A. FRAHM ET AL          1,765,368
METHOD OF WELDING
Filed Feb. 13, 1928          4 Sheets-Sheet 4

Inventors
C. A. Frahm
E. W. Riemenschneider
By Frease and Bond Attorneys

Patented June 24, 1930

1,765,368

UNITED STATES PATENT OFFICE

CARL A. FRAHM AND EDMUND W. RIEMENSCHNEIDER, OF CANTON, OHIO, ASSIGNORS TO THE UNION METAL MANUFACTURING COMPANY, OF CANTON, OHIO, A CORPORATION OF OHIO

METHOD OF WELDING

Application filed February 13, 1928. Serial No. 253,948.

The invention relates to the butt-welding of the edges of sheet metal and more particularly to the welding of the adjoining edges of sheet metal shafts and columns.

Welding may be accomplished by use of the metal electrodes arc welder, the carbon electric arc welder or the oxy-acetylene welder. The metal electrode arc welder includes a metal rod through which current is passed and which is melted onto the parent metal, forming a thickened ridge at the point of the weld.

This ridge is more or less uneven and irregular and where the welded metal is afterwards formed, such as the fluted shafts disclosed in our co-pending application, Serial No. 249,353, filed January 25, 1928, this ridge is objectionable.

In the carbon electric arc and oxy-acetylene methods of welding, the parent metal itself is fused and is burned to a certain extent, often thinning or weakening the metal by oxidizing at or adjacent to the point of welding.

If new material is added, it is common knowledge that the resulting weld is not as good as in cases where the parent material is melted down and welded.

Where tubular metal shafts are welded with any one of the methods above described and then formed or fluted as above mentioned, the shafts frequently split at the point of the weld owing to the burned and weakened condition of the metal.

It has been found that to maintain ideal results in machine welding, all conditions must be uniform, that is, the metal edge must be of uniform dimension throughout its length. Commercial sheets are not furnished provided with suitable edges to conform with ideal conditions above outlined.

The object of the present improvement is to provide a process for welding the abutting edges of sheet metal and particularly for welding the adjoining edges of sheet metal shafts and the like which includes the thickening of the abutting edges of the metal to strengthen the same at the weld and at points adjacent thereto.

The thickened edge portions of the sheet may also be shaped so as to interfit and thus assure a perfect a perfect alignment thereof; and the edges may be so shaped as to retain a flux.

The above and other objects may be accomplished by cold rolling or otherwise thickening the edges of the sheet metal, and by forming an interfitting tongue and groove thereon to assure proper alignment of the edges, and the edges may be knurled or recessed to retain a flux for welding.

The cold rolling of the metal removes all scale from this portion of the sheet and thus provides a better welding surface. The thickening of the sheet at the edge portions adds parent material for providing a strong weld with a uniform straight edge and the increasing of the material adjacent to the weld thus strengthens the point which would otherwise be weakened by the welding operation.

The invention involves more particularly the welding of thickened edge portions of metal sheets and the like, by abutting them together, and then heating the edge portions by the application of an external arc or flame, to fuse and weld the same while holding the edges closely together; as distinguished from a resistance welding or a pressure welding, or a combination of resistance and pressure welding.

Figure 13:
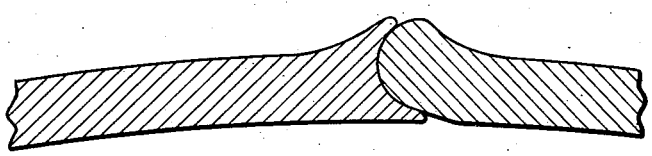
Figure 14:
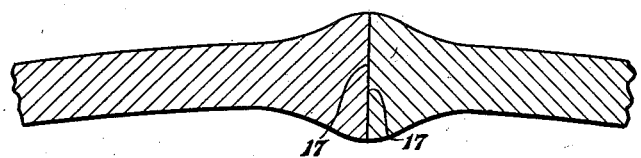
Figure 15:
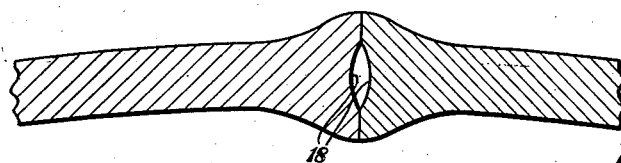
Figure 16:
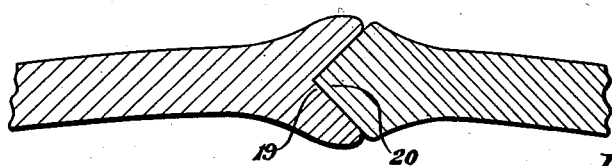
Figure 17:
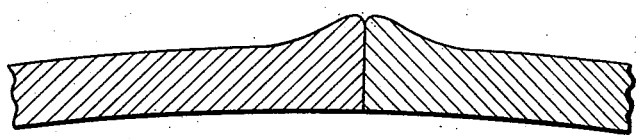
Figure 18:
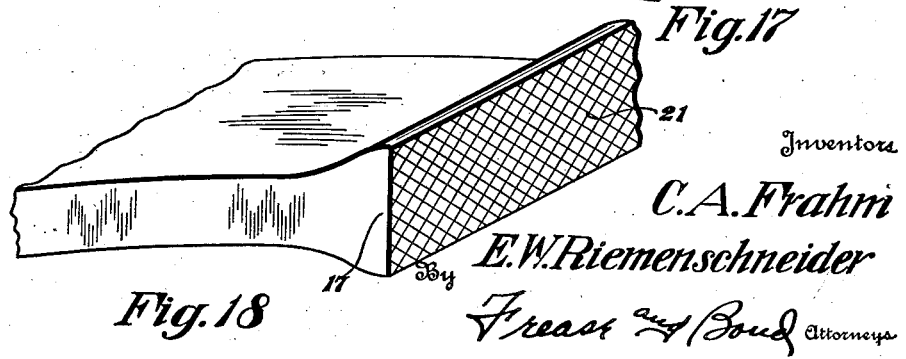

An embodiment of the invention is illustrated in the accompanying drawings, in which Figure 1 is a plan view of a complete apparatus for forming and welding tapered tubular poles, showing the edge rolling mechanism therein;

Fig. 2, an enlarged plan view of the edge rolling mechanism;

Fig. 3, an enlarged sectional view of the same;

Fig. 4, an elevation of a tapered tubular column such as may be formed by the improved process;

Figs. 5, 6, 7 and 8, transverse sections of tubular columns showing various forms of welds which may be produced by the improved process;

Figs. 9, 10 and 11, enlarged transverse sectional views, showing the steps in carrying out one form of the invention;

Fig. 12, an enlarged transverse sectional view through the meeting edge portions of a tubular shaft or the like with the edges thickened for welding according to the improved process and provided with a tongue and groove connection for aligning the edges;

Fig. 13, a view similar to Fig. 12, showing the edges rolled to provide a smooth inside surface;

Fig. 14, a similar view showing the edges merely thickened without any interlocking;

Fig. 15, a view similar to Fig. 14, showing the edges recessed to provide a flux channel;

Fig. 16, a modification of the form shown in Fig. 12;

Fig. 17, a modification of the form shown in Fig. 14 shaped to provide a smooth inside surface; and Fig. 18, a detached perspective view of a portion of one edge with the face knurled to retain flux.

Similar numerals refer to similar parts throughout the drawings.

The invention is illustrated as applied to the welding of the abutting edges of a tubular metal shaft. The apparatus for forming and welding the shafts may comprise the initial forming mechanism indicated generally at 1 and the final or tube forming mechanism indicated generally at 2 and provided with suitable means such as the drawbench 3 for pulling the tubes therethrough.

Any suitable means may be employed for applying external heat to the abutting edge portions of the tube, as it emerges from the final forming mechanism, at the point indicated at 4; as for instance, an electric arc formed between the adjacent pole and the metal to be welded or an acetylene torch, as distinguished from any form of resistance welding.

As illustrated in Fig. 1, the initial and final forming mechanism may be located in alignment for continuous passage of the blanks through the same as illustrated and described in Riemenschneider application Serial No. 208,491, filed July 26, 1927, and the edge thickening or upsetting mechanism may be in the form of cold rolling mechanism shown generally at 5 and located in alignment with the primary forming mechanism, whereby the blank shown generally at 6 is first passed through the edge thickening mechanism where the edges are cold rolled and thickened as indicated generally at 7, and then in turn through the initial and final forming mechanisms, the thickened edges being butted together and welded as the finished shaft emerges from the final forming mechanism.

As best shown in Figs. 2 and 3, this cold rolling mechanism for thickening the edges of the sheet may comprise upper and lower rolls 8 adapted to engage the sheet at each edge portion and an intermediate roll 9 journaled on an axis at right angles thereto and adapted to operate against the edge of the sheet.

These rolls may be so shaped as to cold roll or swage the edges of the sheet into any desired shape. For instance, as shown in Fig. 3, one edge of the sheet may be thickened and slightly grooved as shown at 10 while the opposite edge is similarly thickened by convexing to fit the groove 10, as shown at 11.

The rolls 8 and 9 at one side edge of the sheet may be rigidly mounted upon a stationary support as at 12 while the rolls 8 and 9 upon the opposite side may be carried in a laterally movable head 13 in order to compensate for the tapered sheet blank 6 required for forming tapered tubular shafts.

This head 13 may be mounted upon the piston rod 14 of a fluid cylinder 15 which may be provided with suitable pressure to hold the rolls 8 and 9 in the head 13 against the adjacent edge of the sheet with the desired pressure.

In order to prevent the sheet from buckling under the pressure, and for feeding the same through the forming rolls, spaced pairs of upper and lower feed rolls 16 may be provided for bearing upon the top and bottom surfaces of the sheet blank at each side of the point where the forming rolls operate thereon.

As shown in Figs. 12 to 17 inclusive, various thickened edge formations may be formed. In Fig. 12 is shown the groove and tongue arrangement shown in Fig. 3. In Fig. 13 a modification of this is shown, the sheet being thickened only at the upper side in order to form a smooth inner surface in the shaft. Fig. 14 shows the sheet thickened alike at each edge and provided with the flat abutting faces indicated at 17.

In Fig. 15 the sheet is thickened in the same manner as in Fig. 14 and each edge provided with a recess 18 to receive a flux or the like.

Fig. 16 is a modification of the form shown in Fig. 12, the groove and tongue being V-shaped as shown at 19 and 20 respectively. Fig. 17 is practically a modification of Fig. 14, the sheet, however, being thickened only at the outer side of the shaft in order to provide a smooth inner surface.

As shown in Fig. 18, the abutting edge faces of the sheet in any of the forms of thickening, may be provided with knurled surfaces as at 21 for the purpose of retaining flux.

With any of the forms illustrated or with modifications thereof, when the abutting edge portions of the metal are heated by the external flame of an arc or torch, so as to fuse the metal and form a puddle, while the edges are held closely together, a strong and durable welded joint is formed and the sheet metal being thickened adjacent to the weld, the joint is strengthened rather than weakened by the operation.

Figs. 5, 6, 7 and 8 show the various forms of welded joints which may be obtained by the different shapes of the edges of the metal illustrated in Figs. 12 to 18.

For instance, forms such as shown in Figs. 12, 14, 15 and 16 when welded may produce the weld joint shown at 25 in Fig. 5, being thickened upon the inside of the column and substantially smooth upon the outside.

This may be accomplished by fusing and melting down the metal at the outside of the shaft until the same substantially conforms to the contour thereof.

The weld joint shown at 26 in Fig. 6 may also be obtained with these forms by fusing the metal only sufficiently to form the weld without melting down the outside surface to conform to the contour of the shaft.

In the same manner, the weld joints shown at 27 and 28 in Figs. 7 and 8 respectively, may be obtained with the forms shown in Figs. 13 and 17.

The finished shaft as shown at 29 in Fig. 4 is thus provided with a uniform weld joint 30 longitudinal of the shaft at the point where the abutting edge portions of the shaft are welded as above described.

Although the invention is illustrated and described as applied to the welding of the abutting edges of a sheet metal shaft or the like, it should be understood that the invention broadly consists in the thickening and abutting the edges of sheet metal and externally heating the abutting thickened edges to fusion while held closely together to form a strong weld joint.

The steps of the invention broadly are shown in Figs. 9, 10 and 11. The sheets 31 to be welded together are first operated upon by the cold rolling mechanism illustrated and described or other suitable means for thickening adjacent edges of the sheets as indicated at 32, and these thickened edges may be shaped as shown in any of the forms illustrated in Figs. 12 to 18.

As shown in Fig. 10, the abutting edges may be shaped to interlock in order to properly align the sheets. These thickened edges of the sheets are then butted together and fused by suitable welding means to form the welded joint as shown at 33 in Fig. 11.

From the above, it will be obvious that by carrying out the improved process, parent material is added at points adjacent to the weld, forming a uniform straight edge and strengthening the portions which are weakened by the welding operation.

The cold rolling of the material, as above pointed out, gives a better welding condition and removes all scale from the edges to be welded together.

By the interlocking constructions illustrated and described, the abutting edges may be accurately aligned so as to give perfect welding condition, and by providing the flux channels or knurling the abutting faces, provision is made for retaining a flux between the edges to be welded.

We claim:

1. The method of butt welding the edges of commercial sheet metal, which consists in cold rolling the edge portions to remove the scale and uniformly straighten and thicken the metal at and adjacent to the edges to be abutted and shaping the edges to interlock one with the other, and then holding the edges closely together and fusing the edge portions only of the thickened metal, to melt the same and form a welded joint with thickened metal adjacent to each side of the weld.

2. The method of butt welding the edges of commercial sheet metal, which consists in cold rolling the edge portions to remove the scale and uniformly straighten and thicken the metal at and adjacent to the edges to be abutted, and then holding the edges closely together and fusing the edge portions only of the thickened metal, to melt the same and form a welded joint with thickened metal adjacent to each side of the weld.

3. The method of butt welding the edges of commercial sheet metal, which consists in uniformly straightening and thickening the metal at and adjacent to the edges to be abutted and shaping the edges to interlock one with the other, and then holding the edges closely together and fusing the edge portions only of the thickened metal, to melt the same and form a welded joint with thickened metal adjacent to each side of the weld.

4. The method of butt welding the edges of commercial sheet metal, which consists in uniformly straightening and thickening the metal at and adjacent to the edges to be abutted, and then holding the edges closely together and fusing the edge portions only of the thickened metal, to melt the same and form a welded joint with thickened metal adjacent to each side of the weld.

5. The method of butt welding the edges of commercial sheet metal, which consists in uniformly thickening the metal at and adjacent to the edges to be abutted, and then holding the edges closely together and fusing the edge portions only of the thickened metal, to melt the same and form a welded joint with thickened metal adjacent to each side of the weld.

In testimony that we claim the above, we have hereunto subscribed our names.

CARL A. FRAHM.
EDMUND W. RIEMENSCHNEIDER.